Patented Mar. 15, 1932

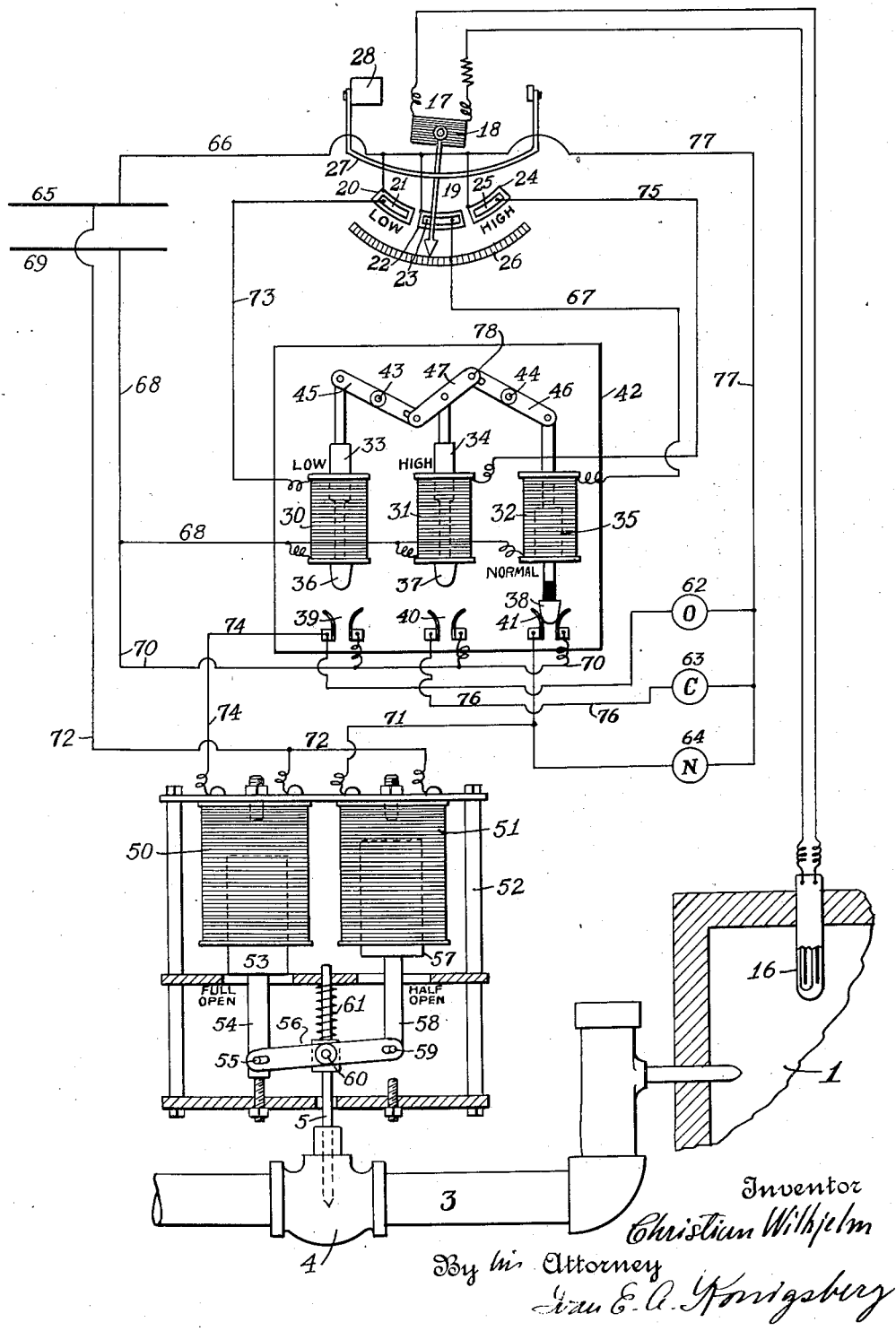

1,849,163

UNITED STATES PATENT OFFICE

CHRISTIAN WILHJELM, OF PHILADELPHIA, PENNSYLVANIA

TEMPERATURE CONTROL APPARATUS

Original application filed January 20, 1927, Serial No. 162,344. Divided and this application filed July 12, 1930. Serial No. 467,399.

This invention relates to a new method and apparatus for controlling the operation of the fuel supply valves to an oven or furnace equipped with an electrically operated temperature controlling device, such for instance as a pyrometer or like device.

In the art it has been generally accepted as standard practice to employ two electric contacts in the controlling device. The operation of one of said contacts causes the opening of the supply valves. The operation of the other contact causes the closing of the supply valves.

For instance, when controlling the supply of fuel to an oven by means of a pyrometer, it is general practice to arrange the operation of the control valve or valves between two extreme predetermined limits. When the temperature in the furnace decreases, the so called low contact in the controlling device is closed to cause the valve to open to its maximum extent, and when the temperature after a while increases beyond the desired point, the so called high contact is closed to cause the valve to close to its minimum extent. The furnace will then quickly cool off, and again the low contact will be closed to cause the control valve to open, and so on.

This method of control is wasteful, inaccurate and unreliable, because it makes it very difficult to maintain an even temperature within the furnace, due to the continuous heating and cooling off of the furnace.

The object of this invention is to provide a controlling device having three contacts:— low, normal and high, and to provide suitably improved apparatus for operating the control valves in accordance with the operations of the controlling device.

My invention is embodied in an apparatus so arranged, that when the temperature is low, and the low contact is closed, the supply valve will be fully opened. When the temperature is high, the high contact is closed and the valve will be closed, all as above described under the present practice. However, when the temperature is normal or within a few degrees, minus or plus, thereof, the "normal" contact is closed and the control valve caused to automatically take a position between open and closed position, or half way, where it will remain so long as the temperature is within desired or permissible limits.

The center or normal contact operates a switch to cause the valve to operate alternately towards open or closed position depending upon the position of the valve at the moment the contact is closed.

That is to say, when the valve is fully open and the normal contact is closed, the valve will be closed one half and vice versa.

In practice it is entirely practical to so adjust a furnace supply valve that in its central or half open position, the required supply of fuel is admitted to maintain the temperature within the furnace at the desired point or within a few degrees minus or plus. And only in extreme cases will it be necessary to open or close the valve to its greatest extent.

This new apparatus and method of control results in stable temperature conditions in the furnace, hence it is economical, accurate and dependable.

My invention is characterized by the fact that it utilizes solenoids to fully open and partly open the supply valve, and to operate by gravity to fully close the valve. It is further characterized by a novel three-contact or three-position relay to close three different electrical circuits, one at a time, irrespective of order to energize the solenoids as aforesaid. This application is a division of my application resulting in the Patent Number 1,788,787, dated January 13th, 1931.

In the drawing accompanying this specification I have disclosed my invention in diagrammatic form.

Referring to the drawing, the reference numeral 1 denotes a furnace having a burner supplied with fuel through a supply pipe 3 having a controlling valve 4 of any standard globe or gate valve type which is operated by moving the valve stem 5 up and down.

The furnace 1 is provided with a temperature registering device of any approved form such for instance as a thermocouple 16 which is connected in the usual manner to the pyrometer 17 which is shown conventionally and includes the usual oscillating coil 18 operating the pointer 19 over a contact table which in this instance comprises low contacts 20 and 21, normal or central contacts 22 and 23, and high contacts 24 and 25. 26 is the pyrometer scale and 27 the usual depressor bar for closing the contacts by depression of the pointer 19. 28 is a clockwork for operating the depressor bar.

The three-position relay referred to comprises three solenoids 30, 31 and 32 each having a plunger 33, 34, 35. To the bottom of each plunger is secured a switch 36, 37 and 38 adapted to close three pairs of contacts 39, 40 and 41. The plungers are interconnected at the top in following manner. The solenoids are suitably mounted on a panel 42 having two fixed pivots 43 and 44 carrying levers 45 and 46. To the top of the middle plunger 34 there is pivoted a third lever 47. The inner end of the levers 45 and 46 are pivoted by pins and slots to the ends of lever 47. The outer ends of levers 45 and 46 are pivoted to the top of the outer solenoid plungers 33 and 35. The levers 45, 46 and 47 are of equal length.

The valve stem 5 is operated by two larger solenoids 50 and 51 mounted in a suitable framework 52. Solenoid 50 has a core 53 with a stem 54 pivoted at 55, by pin and slot, to one end of a lever 56. Solenoid 51 has a core 57 with a stem 58 pivoted at 59, by pin and slot, to the other end of lever 56. The latter is pivoted at 60 to the valve stem 5. The cores of the solenoids are heavy and tend to drop by gravity, their downward movement being assisted by a spring 61. 62, 63, 64 are electric lamps functioning as remote valve position signals.

The diagram illustrates the parts in position while the normal or desired temperature prevails within the furnace and during which time the valve is correspondingly partly opened as shown. While this condition exists, the normal contacts 22—23 are being periodically closed by the depressor bar 27.

The closing of the contacts 22—23 closes a circuit through normal relay solenoid 32 as follows: From line 65 through wire 66, contacts 22—23, wire 67, solenoid 32 and wire 68 back to the line 69. Thus solenoid 32 is energized and will pull down core 35 and switch 38 will close contacts 41. Thus a circuit will be established through partly open valve solenoid 51 as follows: From line 69, wires 68 and 70, through contacts 41, wire 71, through solenoid 51 and back to line 65 via wire 72. Consequently core 57 of solenoid 51 will be pulled up, lever 56 moving about pivot 55 as a center, the valve stem 5 will be lifted and the valve partly opened. It will be noted that the dropping of relay core 35 has not affected the relay cores 33 and 34. The parts will now remain in this position so long as the normal temperature prevails in the furnace within normal or permissible limits.

If now the temperature falls below the permissible normal, pointer 19 will move in over and periodically close low contacts 20—21. The circuit is now as follows:— From line 65 through wire 66, contacts 20—21, wire 73, low relay solenoid 30, wire 68 to line 69. Hence the solenoid core 33 is pulled down and switch 36 closes contacts 39.

Now it will be noted that when the core 33 moves down, the lever 45 is swung on fixed pivot 43 in an anticlockwise direction. Consequently lever 47 is moved in a clockwise direction and lever 46 in an anticlockwise direction on its fixed pivot 44 thereby lifting core 35 and breaking contacts 41. As a consequence partly open valve solenoid 51 is deenergized.

However, as has been seen, a circuit is now established through low contacts 39 as follows:—From line 69, wires 68 and 70, contacts 39, wire 74, through full open valve solenoid 50 and back through wire 72. The core 53 is therefore lifted, the lever 56 swinging around pivot 59 and the valve stem is lifted still further and the valve 4 fully opened, it being understood that solenoid 50 is adjusted so that its core will have a longer stroke than core 57 of solenoid 51.

If now the temperature rises to normal, the normal relay solenoid 32 will again be energized, the circuit through contacts 41 will again be established and partly open valve solenoid 51 will be energized to partly open the valve, the solenoid 50 then being deenergized and its core 53 drops.

If now the temperature rises above the permissible normal limit, the pyrometer contacts 24—25 will be periodically closed and establish a circuit as follows:—From the line 65, wire 66, contacts 24—25, wire 75 to high relay solenoid 31. The core 34 thereof will be pulled down and close contacts 40 to establish a circuit from line 69, wires 68 and 70, contacts 40, wire 76, signal 63, wires 77 and 66 back to line 65.

Attention is again called to the operation of the relay. When the core 34 drops, the lever 47 is moved down in the center, hence the pivot connection at 78 is lowered, consequently lever 46 is swung anti clockwise and the core 35 is raised to break contacts 41. The other relay core 33 being already in its upper position is not disturbed. The breaking of the circuit through contacts 41 disestablishes the circuit through valve solenoid 51, and the valve is closed by gravity, hence the fuel supply is cut off because the oven temperature is too high.

In this instance the closed position of the valve is shown by the lighting of signal 63, and both the other positions of the valve may be shown by normal signal 64 connected to contacts 41 and open signal 62 connected to contacts 39 in an obvious manner.

When now the temperature goes back to normal, the partly open valve solenoid 51 will be energized as before to partly open the valve. It will therefore be noted that when normal relay solenoid 32 is energized its core 35 will drop, its lever 46 will move clockwise thus raising the pivot 78 to lift the high relay core 34 and break the contacts 40.

In other words, the three position relay controls three separate circuits and will respond to effect such control when any one of the three relay solenoids are energized irrespective of the order of energization, the control being such that when any one solenoid is energized it establishes a new circuit and causes the disestablishment of previous circuits. I believe this feature to be broadly new and I do not desire to limit this relay to the present invention. In the practical construction of the relay for purposes of this invention, it is an obvious advantage to locate the "high" solenoid in the middle because it only operates to make and break the circuit through the corresponding signal and the movement of its core may therefore be less than the other two.

Another advantage resides in the present invention in that I use only one solenoid at a time to operate the valve thus effecting obvious economy in current consumption.

It is, however, within the scope of the invention to wire the valve solenoids so that both may be energized at one time to open the valves when the temperature is low. This, being an obvious modification, is not illustrated. The advantage of such an arrangement would be that when large valves are used it may be desirable to operate them by two solenoids for more immediate action.

While the invention is shown as applied to a temperature controlling apparatus for a furnace, it is applicable for other purposes in that it is obvious that the solenoids may be used to operate any suitable movable element and the circuits through the relay may be caused by other means than a pyrometer.

The foregoing is thought to clearly set forth the invention and the advantages resulting therefrom and while I have disclosed it in its preferred form, nevertheless it will be understood that I do not desire to limit myself to the exact disclosure, but that changes and alterations may be made without departing from the principle of the invention or the scope of the appended claims.

I claim:—

1. A system for regulating the temperature in a furnace having a valve controlled fuel supply comprising in combination a plurality of solenoids for operating said valve, an electric circuit and a mechanism in said circuit for automatically energizing one of said solenoids to move said valve into half open position and maintain the valve in such half open position while a predetermined temperature range exists within the furnace and for automatically de-energizing the said one solenoid and energizing another of said solenoids to move said valve into full open position in response to a decrease in said temperature range, said mechanism including means for automatically de-energizing said other solenoid and re-energizing the said first solenoid in response to a subsequent increase in temperature to within the said predetermined range.

2. A system for regulating the temperature in a furnace having a valve controlled fuel supply comprising in combination two solenoids, an electric circuit therefor, means in said circuit for automatically energizing said solenoids in predetermined sequence to move the valve successively into half open and full open positions in response to a normal range of temperatures existing within said furnace and a subsequent decrease thereof and for automatically de-energizing the solenoid last energized when the temperatures within said furnace increases beyond a predetermined point, and means for automatically closing said valve when the said solenoids have been de-energized as aforesaid.

3. A system for regulating the temperature in a furnace having a valve controlled fuel supply comprising in combination a solenoid for moving the valve into half open position, a second solenoid for moving the valve from half to full open position, an electric circuit for energizing said solenoids, a relay in said circuit for controlling the energizing of the two solenoids sequentially as aforesaid and for de-energizing the solenoid last energized, the energizing and de-energizing of the solenoids being automatic in response to predetermined temperatures within the furnace and gravity operated means for closing said valve.

4. A system for regulating the temperature in a furnace having a valve controlled fuel supply comprising in combination an electrically actuated mechanism for operating said valve in response to predetermined temperatures within the furnace, a supply of electrical current, a plurality of electrical circuits leading from said current supply to the said mechanism to actuate the same, a device in said circuits for automatically closing any one of said circuits and simultaneously therewith opening all the other circuits and means for causing said device to act in response to temperature changes within the furnace.

5. A system for regulating the temperature in a furnace having a valve controlled fuel supply comprising in combination two solenoids for operating said valve, a plurality of electrical circuits for supplying current to said solenoids, a device for periodically closing any one of said circuits in response to temperature variations within the furnace, a mechanism in said circuits for automatically closing any one of them for a given length of time in response to the operations of the said device to energize any one of said solenoids for a similar given length of time and for opening all of the other circuits irrespective of the periodical opening or closing of the circuits by the said device.

CHRISTIAN WILHJELM.